March 3, 1970   R. P. BIANCO   3,497,986
FISHING LURE
Filed March 11, 1968
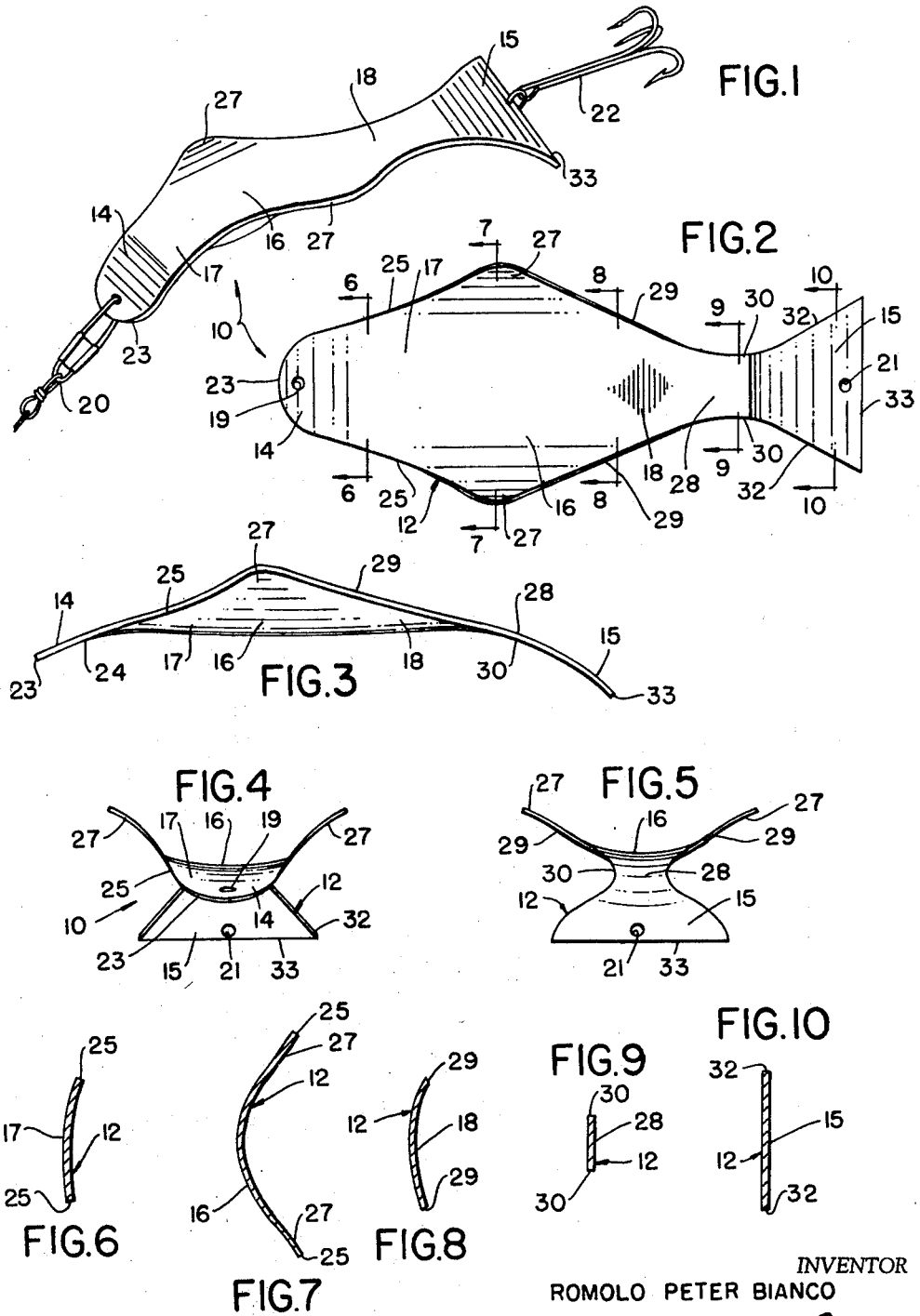
INVENTOR
ROMOLO PETER BIANCO
BY Whittemore Hulbert & Belknap
ATTORNEYS

United States Patent Office 3,497,986
Patented Mar. 3, 1970

3,497,986
FISHING LURE
Romolo Peter Bianco, 2803 Grindley Park,
Dearborn, Mich. 48124
Filed Mar. 11, 1968, Ser. No. 711,930
Int. Cl. A01k 85/04
U.S. Cl. 43—42.5       2 Claims

ABSTRACT OF THE DISCLOSURE

An elongated fishing lure of stamped sheet metal in uniform thickness throughout and plated to present a high gloss reflective appearance has a body portion upwardly concave and downwardly convex in transverse cross section at a medial area or zone in its length, the concavo-convexity being quite deep, as compared with the remaining head and tail portions of the body, which respectively merge rearwardly and forwardly into the medial zone. The medial zone includes substantially triangular wing-like side extensions having rectilinear sides. The tail portion resembles in plan a sharply flared-out caudal fluke substantially flat and rectilinear at its rearmost edge and merges forwardly and upwardly in a longitudinally and vertically convex curvature to a substantially flat zone, which in turn merges with the concavoconvex, extension-bearing intermediate portion. The head portion of the lure body is substantially flat, being convexly rounded at its forward edge.

BACKGROUND OF THE INVENTION

Field of the invention

The invention obviously relates to the sport of angling, being of utility in any aspect thereof, for example, bait casting, lake or sea trolling, spinning, etc., the lure being proportionable in regard to size to adapt itself to the varying requirements of these branches of the sport.

Description of the prior art

Of the prior art developed in a search, the most pertinent patents are Streich No. 1,585,943 of May 25, 1926; Zeibig No. 2,394,132 of Feb. 5, 1946; and Novitsky No. 2,570,474 of Oct. 9, 1951. These show fishing lures of a nature only generally similar to that herein shown, lacking specific features of advantages referred to in the abstract, and hereinafter further described and claimed.

SUMMARY OF THE INVENTION

In use, the improved lure, due to its various features of shape and proportioning, in plan, elevation and in cross-sectional planes, has a highly distinctive action or motion of ducking or diving, rising, wobbling in the vertical sense, tilting laterally one way or the other, etc., which makes it a sure attention-getter and killer. As produced in a high glossy finish, it has further ability to attract both "fisherman and fish." The lure is very compact, and is very cheaply produced for sale at an ample profit margin, since its manufacture calls but for a simple stamping operation using relatively simply contoured, inexpensive dies. As indicated above, the lure is capable of production in a widely varying range of sizes, suitable to stream or river, pond, lake or ocean fishing, and may, accordingly, be offered individually to the purchasing public, or, for example, in a kit or package containing different sizes.

BRIEF DESCRIPTION OF THE DRAWING

FIG. 1 is a perspective view illustrating in full size a typical lure in accordance with the invention, with line swivel and hook means applied fore and aft;

FIG. 2 is a top plan view of the body only of the improved lure;

FIG. 3 is a side elevational view of the lure;

FIGS. 4 and 5 are, respectively, front and rear elevational views; and

FIGS. 6, 7, 8, 9 and 10 are, respectively, views in transverse vertical section on lines 6—6, 7—7, 8—8, 9—9 and 10—10 of FIG. 2, all being rotated 90° clockwise.

DESCRIPTION OF A PREFERRED EMBODIMENT

The lure of the invention, generally designated by the reference numeral 10, is fabricated, as a single piece, of stamped sheet metal such as steel, brass or the like to provide a main body 12 whose outline in plan (FIG. 2) quite closely resembles that of a game or pan fish in side elevation. Body 12 is of uniform sheet thickness throughout, and in general comprises a forward head portion 14, a rear tail portion 15, and a central or medial main body portion 16, with which the head portion 14 merges rearwardly through a forward intermediate zone at 17 and the tail portion 15 merges forwardly through a rearward intermediate zone 18.

Head portion 14 is apertured at 19 on the longitudinal centerline of the lure, to receive a swivel-type line connector 20 (FIG. 1); while tail portion 15 is similarly apertured at 21 to receive a gang-type or other hook 22.

Considering FIGS. 3 and 4, the head portion of lure body 12 is, at its forwardmost extremity, substantially flat (FIG. 3), and merges rearwardly and a bit upwardly with central body portion 16 through the forward intermediate zone 17, and which last zone the body 12 is, as shown in FIGS. 3, 4 and 6, mildly upwardly concave in section transversely of the body. There is also a slight upward convexity at 24, as best shown in FIG. 3, in the endwise direction.

Continuing to the rear, and with reference now to FIG. 7 in conjunction with the others, intermediate zone 17 increases in its degree of upward concavity and downward convexity as it merges, surface-wise, into the central or medial body portion 16, at the approximate center of which last zone the concavo-convexity of body 12 is maximum.

As the head portion 14 thus extends rearwardly in a changing concave-convex cross section as to surface, its rounded forward edge 23 diverges rearwardly along approximately straight side edges 25, the latter defining substantially triangular wing-like side extensions 27 at the cross section of maximum side-to-side width and vertical concavity of the lure body 12 in the plane of section line 7—7. The side extensions 27 flare laterally outwardly to their tips so as to be downwardly concave in transverse section, as shown in FIGS. 4 and 5. The body is exactly symmetrical in this medial zone (as at all other longitudinally successive zones thereof) about the longitudinal centerline of the lure through the respective forward and rearward apertures 19 and 21.

Further to the rear of its cross section at line 7—7 (FIG. 2) the concavo-convexity of body 12 progressively decreases in depth (FIG. 8) through the rearward intermediate mergence portion 18, becoming flat and rectilinear in cross section at the narrowest portion 28 of lure body 12, just forward of tail portion 15, as depicted in FIG. 9. In reaching this point, the body converges rearwardly and downwardly in plan (FIG. 2) along opposite side edges at 29, then rounds mildly inwardly in opposite directions, as at 30, in the narrow connecting portion or zone 28.

From the last named, flat-sectioned zone the lure body takes a vertically downwardly curvature in the tail portion 15, but only in this single directional sense and not in the transverse sense, like the intermediate body portion 16, for tail portion 15 is substantially flat. This fluke-like tail portion as a whole is sharply flared divergently along its opposite side edges 32 and its rear edge 33 is rectilinear and normal to the longitudinal axis of lure body 12.

The special features of shaping of the body 12, particularly in respect to its respectively like side edge portions 25, 29, 30 and 32, in respect to its deep concavity-convexity at portion 16, progressively diminishing in depth to front and rear, in respect to its sharp tail side flare, and in respect to its overall bowed shape as viewed in side elevation (FIG. 3) all contribute to a highly unique action of the lure 10 in retrieval or in trolling, characterized by ducking, bobbing, rolling; in general, an action realistically simulative of an evasive movement of a fish. These characteristics have made the lure an extremely effective one in landing various types of fish. The simplicity of the lure places it well within the price range of any fisherman.

What is claimed is:

1. An elongated fishing lure of integral, one-piece sheet material of uniform thickness, said lure having a head portion, a tail portion, and a main body portion between said head and tail portions, said lure being symmetrical about its longitudinal center line, said main body portion being upwardly concave in transverse section, said head portion extending downwardly from said main body portion in a forward direction, said tail portion extending downwardly from said main body portion in a rearward direction, said main body portion having substantially triangular wing-like side extensions which extend upwardly and flare laterally outwardly to their tips so as to be downwardly concave in transverse section, the edges of each side extension meeting at an obtuse angle to form an apex defining the tip thereof, said edges of said side extensions extending forwardly and rearwardly from said tips and being substantially straight adjacent said tips and merging respectively with the edges of said head and tail portions.

2. The elonagted fishing lure defined in claim 1, wherein said head portion at its forward extremity is substantially flat, said head portion where it merges with said main body portion being upwardly concave in transverse section and downwardly concave in longitudinal section, said tail portion at its rearward extremity being substantially flat, said tail portion where it merges with said body portion being substantially flat in transverse section and downwardly concave in longitudinal section, the degree of upward concavity of said main body portion being a maximum across the tips of said side extensions and decreasing to a minimum adjacent the points of merger with said head and tail portions.

References Cited

UNITED STATES PATENTS

| | | | |
|---|---|---|---|
| 2,394,132 | 2/1946 | Zeibig | 43—42.5 |
| 2,721,414 | 10/1955 | Ross | 43—42.5 |
| 3,230,658 | 1/1966 | Wuotila | 43—42.5 X |

SAMUEL KOREN, Primary Examiner

D. J. LEACH, Assistant Examiner